US012586430B2

(12) United States Patent
Sudou et al.

(10) Patent No.: US 12,586,430 B2
(45) Date of Patent: Mar. 24, 2026

(54) OPERATION MANAGEMENT SYSTEM, OPERATION MANAGEMENT APPARATUS, OPERATION MANAGEMENT METHOD, AND NON-TRANSITORY STORAGE MEDIUM

(71) Applicant: NEC Corporation, Tokyo (JP)

(72) Inventors: Akihisa Sudou, Tokyo (JP); Daisuke Kawasaki, Tokyo (JP); Kaori Yamane, Tokyo (JP)

(73) Assignee: NEC CORPORATION, Tokyo (JP)

( * ) Notice: Subject to any disclaimer, the term of this patent is extended or adjusted under 35 U.S.C. 154(b) by 97 days.

(21) Appl. No.: 18/283,135

(22) PCT Filed: Mar. 24, 2021

(86) PCT No.: PCT/JP2021/012411
§ 371 (c)(1),
(2) Date: Sep. 20, 2023

(87) PCT Pub. No.: WO2022/201400
PCT Pub. Date: Sep. 29, 2022

(65) Prior Publication Data
US 2024/0177549 A1 May 30, 2024

(51) Int. Cl.
*G07C 9/00* (2020.01)
*G06Q 10/02* (2012.01)
*G06Q 50/47* (2024.01)

(52) U.S. Cl.
CPC ......... *G07C 9/00563* (2013.01); *G06Q 10/02* (2013.01); *G06Q 50/47* (2024.01)

(58) Field of Classification Search
CPC ..... G07C 9/00563; G06Q 50/47; G06Q 10/02
See application file for complete search history.

(56) References Cited

U.S. PATENT DOCUMENTS

| | | | |
|---|---|---|---|
| 10,275,670 B1 * | 4/2019 | Li | G06V 40/16 |
| 10,621,802 B2 * | 4/2020 | Makita | G07C 9/30 |

(Continued)

FOREIGN PATENT DOCUMENTS

| | | |
|---|---|---|
| JP | 2015-062516 A | 4/2015 |
| JP | 2016-173732 A | 9/2016 |

(Continued)

OTHER PUBLICATIONS

Extended European Search Report for EP Application No. 21933010.7, dated on Mar. 11, 2024.

(Continued)

*Primary Examiner* — Thomas D Alunkal
(74) *Attorney, Agent, or Firm* — Sughrue Mion, PLLC

(57) ABSTRACT

An operation management system (100) includes a server apparatus (102) and an operation management apparatus (103). The operation management system (100) includes: a reservation acceptance unit (111) acquiring reservation information including biometric information of a user making a boarding reservation for a vehicle, and a boarding point; a boarding information acquisition unit (120) acquiring boarding information including biometric information of the user generated by a camera (103) equipped on the vehicle and boarding place information indicating the boarding point; and an authentication unit (113) determining whether there is a match of biometric information and a boarding point that are included in each piece of the reservation information and the boarding information.

10 Claims, 18 Drawing Sheets

(56) References Cited

U.S. PATENT DOCUMENTS

| | | | |
|---|---|---|---|
| 11,358,566 B2 * | 6/2022 | Kim | ................... G06V 40/1365 |
| 2017/0048239 A1 * | 2/2017 | Jeon | ................... H04W 12/065 |
| 2019/0035042 A1 * | 1/2019 | Attar | ...................... G07C 9/257 |
| 2019/0259227 A1 * | 8/2019 | Oesterling | ............. G06Q 10/02 |
| 2019/0272484 A1 * | 9/2019 | Saito | .................... B60R 25/305 |
| 2019/0311629 A1 * | 10/2019 | Sierra | ................... G06Q 10/02 |
| 2020/0159251 A1 | 5/2020 | Iwasaki et al. | |
| 2021/0326769 A1 * | 10/2021 | Mendes | .......... G06Q 10/06315 |

FOREIGN PATENT DOCUMENTS

| | | |
|---|---|---|
| JP | 2019-101684 A | 6/2019 |
| JP | 2019-153106 A | 9/2019 |
| JP | 2020-042491 A | 3/2020 |
| JP | 2020-098610 A | 6/2020 |
| JP | 2020-126470 A | 8/2020 |
| JP | 2020-154996 A | 9/2020 |
| JP | 2020-194455 A | 12/2020 |
| WO | 2018/030987 A1 | 2/2018 |
| WO | 2018/207357 | 11/2018 |

OTHER PUBLICATIONS

International Search Report for PCT Application No. PCT/JP2021/012411, mailed on May 25, 2021.
Al-Momani, A. et al. "iRide: A Privacy-Preserving Architecture for Self-Driving Cabs Service", 2018 IEEE Vehicular Networking Conference, 2018, pp. 1-8. 1, 2, I., II. A.
Gupta, S. et al. "A Perspective Study Towards Biometric-based Rider Authentication Schemes for Driverless Taxis". 2019 International Conference on Innovation and Intelligence for Informatics, Computing, and Technologies, 2019, pp. 1-6 pp. 1, 3-6, I., III. B., C., IV. A.-B.
Japanese Office Action for JP Application No. 2023-508292 mailed on Oct. 1, 2024 with English Translation.
Japanese Office Communication (Decision of Refusal) for JP Application No. 2023-508292 mailed on Feb. 4, 2025 with English Translation.
Japanese Office Communication (Decision of Dismissal of Amendment) for JP Application No. 2023-508292 mailed on Feb. 4, 2026 with English Translation.
Navitime Japan Co. Ltd., ""Car Navi Time" strengthens real-time rerouting. It speaks out traffic information that may cause rerouting, such as road closures and congestion.", Japan, Jun. 29, 2017, [Jan. 23, 2025 search], https://corporate.navitime.co.jp/topics/pr/201706/29_4149.html.

* cited by examiner

| | |
|---|---|
| SCHEDULED BOARDING TIME | |
| BOARDING POINT | ○○ STORE ○○ BRANCH |
| SCHEDULED DISEMBARKATION TIME | 11:00 |
| DISEMBARKATION POINT | ○○ HOSPITAL |

110a

| USER IDENTIFICATION INFORMATION | FACE INFORMATION |

Figure 7:
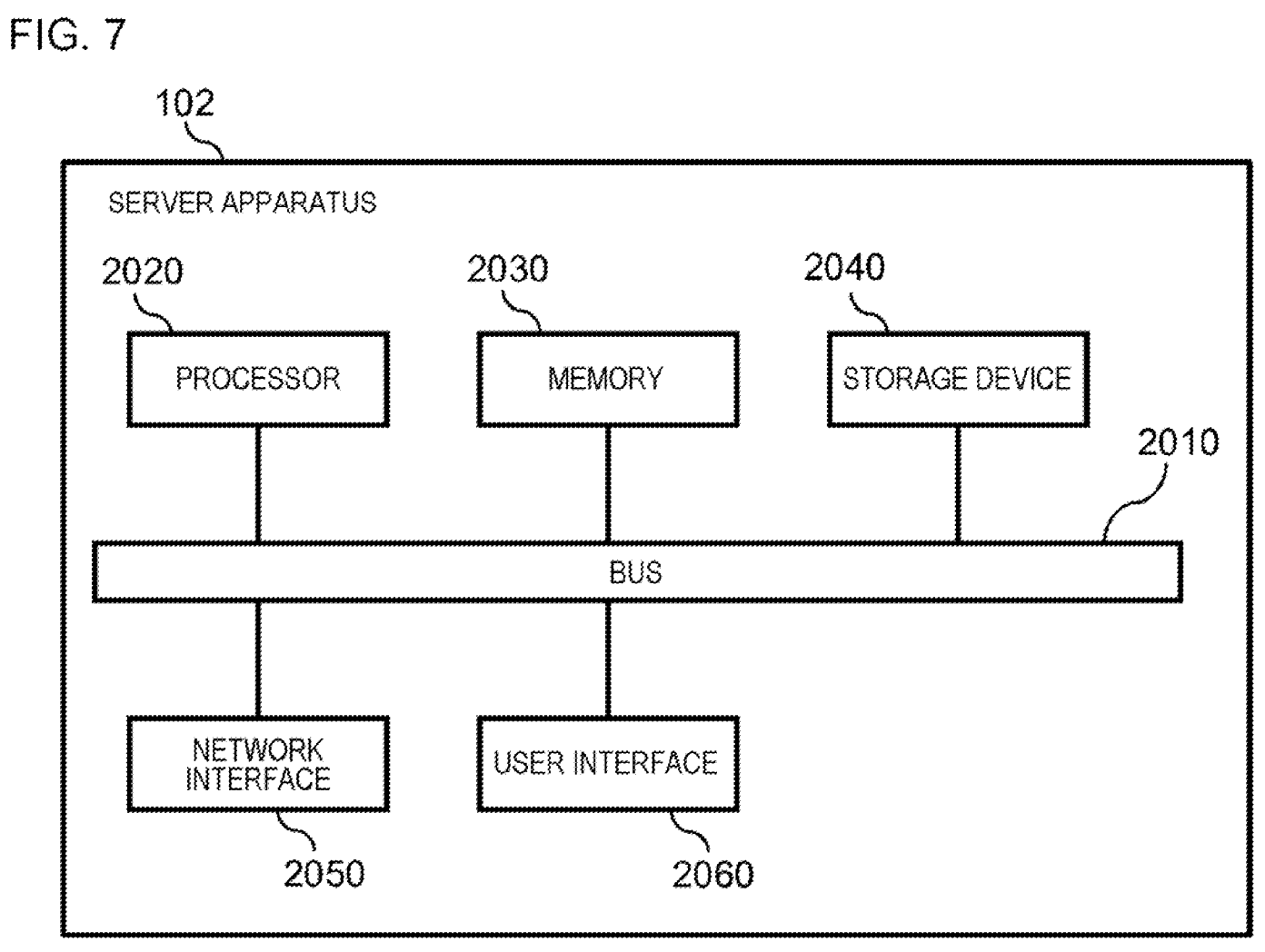

SERVER APPARATUS

2020    PROCESSOR

2030    MEMORY

2040    STORAGE DEVICE

2010    BUS

2050    NETWORK INTERFACE

2060    USER INTERFACE

110b

| USER IDENTIFICATION INFORMATION | FACE INFORMATION | USE HISTORY | CONTACT INFORMATION |
|---|---|---|---|

OPERATION MANAGEMENT SYSTEM, OPERATION MANAGEMENT APPARATUS, OPERATION MANAGEMENT METHOD, AND NON-TRANSITORY STORAGE MEDIUM

This application is a National Stage Entry of PCT/JP2021/012411 filed on Mar. 24, 2021, the contents of all of which are incorporated herein by reference, in their entirety.

TECHNICAL FIELD

The present invention relates to an operation management system, an operation management apparatus, an operation management method, and a non-transitory storage medium.

BACKGROUND ART

On-demand type transportation services, such as a bus and a shared taxi, operating according to demand of a user have been provided. For example, in order for a customer preferring ridesharing to travel comfortably, Patent Document 1 discloses a compatibility determination apparatus determining compatibility between customers, based on attributes of customers preferring ridesharing.

CITATION LIST

Patent Literature

Patent Document 1: Japanese Patent Application Publication No. 2020-042491

SUMMARY OF INVENTION

Technical Problem

However, there is a demand for various technologies for improving convenience of a user of an on-demand type transportation service.

The present invention has been made in view of the aforementioned circumstances, and an object of the present invention is to improve user convenience.

Solution to Problem

In order to achieve the object, an operation management system according to a first aspect of the present invention includes:

a reservation acceptance means for acquiring reservation information including biometric information of a user making a boarding reservation for a vehicle, and a boarding point;

a boarding information acquisition means for acquiring boarding information including biometric information of the user generated by a generation means equipped on the vehicle and boarding place information indicating the boarding point; and an authentication means for determining whether there is a match of biometric information and a boarding point that are included in each piece of the reservation information and the boarding information.

An operation management apparatus according to a second aspect of the present invention includes:

a reservation acceptance means for acquiring reservation information including biometric information of a user making a boarding reservation for a vehicle, and a boarding point;

a boarding information acquisition means for acquiring boarding information including biometric information of the user generated by a generation means equipped on the vehicle and boarding place information indicating the boarding point; and an authentication means for determining whether there is a match of biometric information and a boarding point between the reservation information and the boarding information.

An operation management method according to a third aspect of the present invention includes, by a computer:

acquiring reservation information including biometric information of a user making a boarding reservation for a vehicle, and a boarding point;

acquiring boarding information including biometric information of the user generated by a generation means equipped on the vehicle and boarding place information indicating the boarding point; and determining whether there is a match of biometric information and a boarding point between the reservation information and the boarding information.

A program according to a fourth aspect of the present invention is a non-transitory storage medium storing a program for causing a computer to execute:

acquiring boarding information including biometric information of the user generated by generation means equipped on the vehicle and boarding place information indicating the boarding point; and determining whether there is a match of biometric information and a boarding point between the reservation information and the boarding information.

Advantageous Effects of Invention

The present invention enables improved user convenience.

BRIEF DESCRIPTION OF DRAWINGS

FIG. 2 is a diagram illustrating an example of a reservation screen according to the example embodiment 1.

FIG. 6 is a diagram illustrating an example of a physical configuration of a user terminal according to the example embodiment 1 of the present invention.

FIG. 7 is a diagram illustrating an example of a physical configuration of the server apparatus according to the example embodiment 1 of the present invention.

DESCRIPTION OF EMBODIMENTS

Example embodiments of the present invention will be described below referring to drawings. Identical components are given identical signs throughout the diagrams, and description thereof is omitted as appropriate.

Example Embodiment 1

An operation management system 100 according to an example embodiment of the present invention is a system for providing an on-demand type transportation service. An on-demand type transportation service refers to a service for operating a vehicle according to user demand, and the present example embodiment is described by an example of operating a bus according to user demand. Note that the vehicle is not limited to a bus and may be a passenger car such as a shared taxi.

Figure 1:
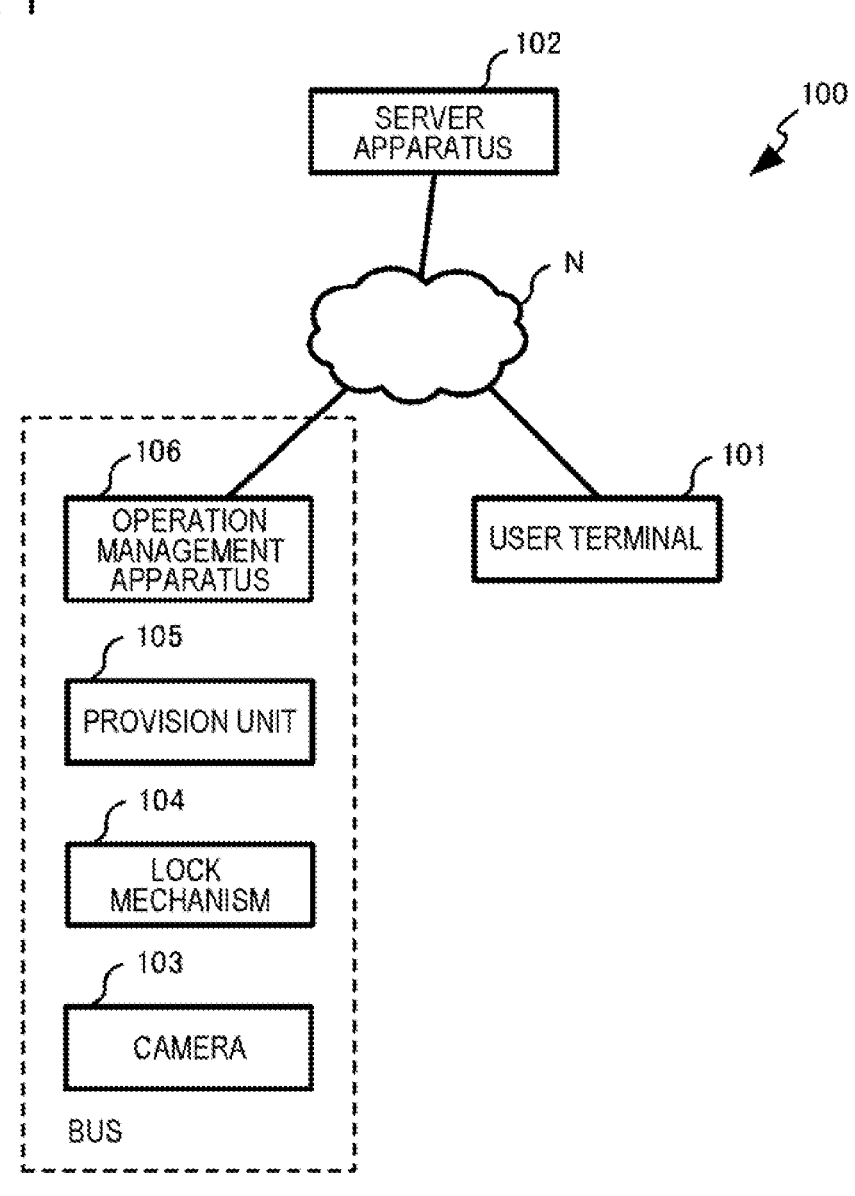
FIG. 1 is a diagram illustrating a configuration of an operation management system according to an example embodiment 1 of the present invention.

The operation management system 100 includes a user terminal 101, a server apparatus 102, and a camera 103, a lock mechanism 104, a provision unit 105, and an operation management apparatus 106 that are equipped on a bus, as illustrated in FIG. 1. The user terminal 101, the server apparatus 102, and the operation management apparatus 106 are connected in such a way as to be able to transmit and receive information to and from each other through a network N constructed based on wired communication, wireless communication, or a combination of the two.

Note that while the present example embodiment is described by an example with one bus, there may be a plurality of buses; and in this case, the camera 103, the lock mechanism 104, the provision unit 105, and the operation management apparatus 106 are preferably equipped on each of the plurality of buses.

The user terminal 101 is a terminal for a user to make a boarding reservation for a bus and, for example, is a smartphone, a tablet terminal, or the like installed with software for reservation for making a boarding reservation for a bus.

When the software is in operation, the user terminal 101 displays a reservation screen RS1 for a user to make a reservation for boarding. When the user inputs information to the reservation screen RS1 and performs a predetermined operation, the user terminal 101 transmits request information including the input information and user identification information to the server apparatus 102.

User identification information is information for identifying a user and, for example, is held in the user terminal 101.

FIG. 2 is a diagram illustrating an example of the reservation screen RS1. The reservation screen RS1 includes input fields for a scheduled boarding time, a boarding point, a scheduled disembarkation time, and a disembarkation point, respectively, and the user inputs a content related to each field. FIG. 2 illustrates an example of "○○STORE, ○○BRANCH" being input as a boarding point and "○○HOSPITAL" being input as a disembarkation point. Further, as for a scheduled boarding time and a scheduled disembarkation time, information has only to be input to at least one of the items; and FIG. 2 illustrates an example of "11:00" being input as a scheduled disembarkation time and nothing being input as a scheduled boarding time.

Note that while FIG. 2 illustrates an example of a facility name being input as each of a boarding point and a disembarkation point, each point may be input by an appropriate method such as inputting an address. Further, a facility has only to be a mark as a boarding point or a disembarkation point without being limited to a store or a hospital and may be a hotel, a station, a tourist spot, a bank, a city hall, a tutoring school, a concert hall, a movie theater, an art museum, a museum, an exhibition hall, a stadium, a ball game ground, a gymnasium, a golf course, an amusement park, an intersection, a bus stop, or the like.

Functional Configuration of Server Apparatus 102

Figure 3:
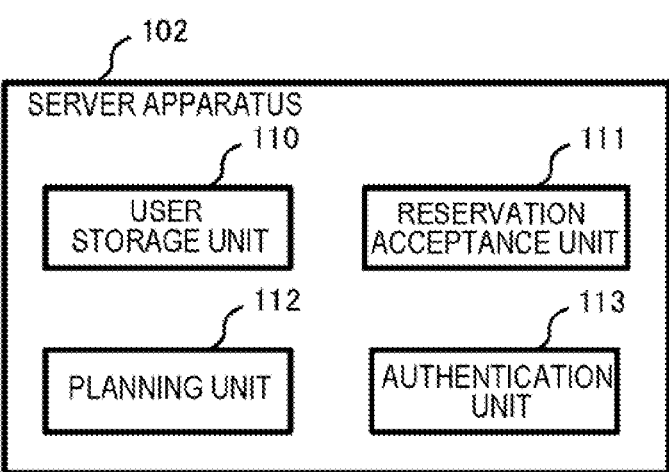
FIG. 3 is a diagram illustrating an example of a functional configuration of a server apparatus according to the example embodiment 1 of the present invention.

FIG. 3 is a diagram illustrating an example of a functional configuration of the server apparatus 102 according to the present example embodiment.

The server apparatus 102 manages operation of an on-demand type bus, along with the operation management apparatus 106. The server apparatus 102 functionally includes a user storage unit 110, a reservation acceptance unit 111, a planning unit 112, and an authentication unit 113, as illustrated in FIG. 3.

Figure 4:
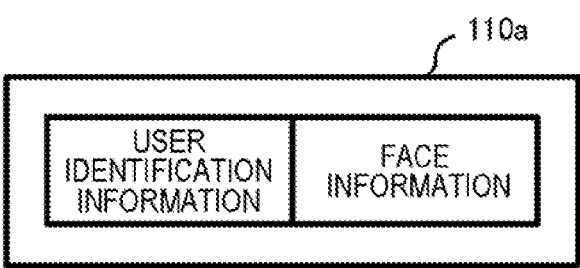
FIG. 4 is a diagram illustrating an example of a structure of user information according to the example embodiment 1.

The user storage unit 110 is a storage unit in which user information 110a is stored. The user information 110a is information about a user of an on-demand type transportation service and is previously stored in the user storage unit 110. For example, user identification information is associated with face information as biometric information in the user information 110a, as illustrated in FIG. 4. Face information includes an image of the face of a user identified by using user identification information associated with the face information.

Note that face information stored in the user storage unit 110 is not limited to information including an image of the face of a user identified by using user identification information associated with the face information and may be information including an image of the face of a user identified by user identification information associated with the face information, feature data of the face, or a combination of the two. Further, face information is an example of biometric information; and biometric information is not limited to information including a face image, feature data of the face, or a combination of the two and may be, for example, iris information, fingerprint information, palm print information, or the like.

FIG. 3 is referred to again.

The reservation acceptance unit 111 acquires reservation information. Reservation information includes face information as biometric information of a user making a boarding reservation for a bus, a boarding point, a disembarkation point, and at least one of a scheduled boarding time and a scheduled disembarkation time.

Specifically, the reservation acceptance unit 111 receives, through the network N, request information transmitted from the user terminal 101. Request information includes user identification information, a boarding point, a disembarkation point, and at least one of a scheduled boarding time and a scheduled disembarkation time.

The reservation acceptance unit 111 refers to the user information 110a and acquires face information associated with user identification information included in the request information. Thus, the reservation acceptance unit 111 acquires reservation information including the acquired face information, and the boarding point, the disembarkation point, and at least one of the scheduled boarding time and the scheduled disembarkation time, the points and the times being included in the request information.

Note that an image of the face of a user may be captured by the user terminal 101 when request information is transmitted, and face information generated from the image may be included in the request information. In this case, the reservation acceptance unit 111 can acquire reservation information, based on the request information, without referring to the user information 110a.

The planning unit 112 prepares an operation plan of a bus, based on reservation information acquired by the reservation acceptance unit 111, and transmits the prepared operation plan to the operation management apparatus 106 through the network N.

The authentication unit 113 determines whether there is a match of face information and a boarding point that are included in each piece of reservation information acquired by the reservation acceptance unit 111 and boarding information acquired by the operation management apparatus 106. As details will be described later, boarding information includes face information generated by capturing an image of a user when the user boards a bus and boarding place information indicating a boarding point.

Specifically, the authentication unit 113 acquires reservation information from the reservation acceptance unit 111. The authentication unit 113 receives boarding information from the operation management apparatus 106 through the network N.

When there is a match of boarding place information included in each piece of the reservation information and the boarding information and there is a match of face information included in each piece of the reservation information and the boarding information, the authentication unit 113 determines that there is a match of face information and a boarding point that are included in each piece of the reservation information and the boarding information.

Further, when there is no match of boarding place information included in each piece of the reservation information and the boarding information or there is no match of face information included in each piece of the reservation information and the boarding information, the authentication unit 113 determines that there is no match of face information and a boarding point that are included in each piece of the reservation information and the boarding information.

The authentication unit 113 transmits the determination result to the operation management apparatus 106 through the network N.

FIG. 1 is referred to again.

By capturing an image of the face of a user boarding a bus, the camera 103 generates face information of the user at the time of boarding. The camera 103 can capture an image of a user before boarding by being provided on an entrance door or the like of a bus and capturing an image of the outside.

The lock mechanism 104 is a mechanism changing openability of a door of a bus. Specifically, the lock mechanism 104 switches between a locked state in which the door of the bus cannot be opened and an unlocked state in which the door of the bus can be opened. For example, a bus is set to the locked state when traveling.

The provision unit 105 is a display or the like providing information to a user.

Functional Configuration of Operation Management Apparatus 106

Figure 5:
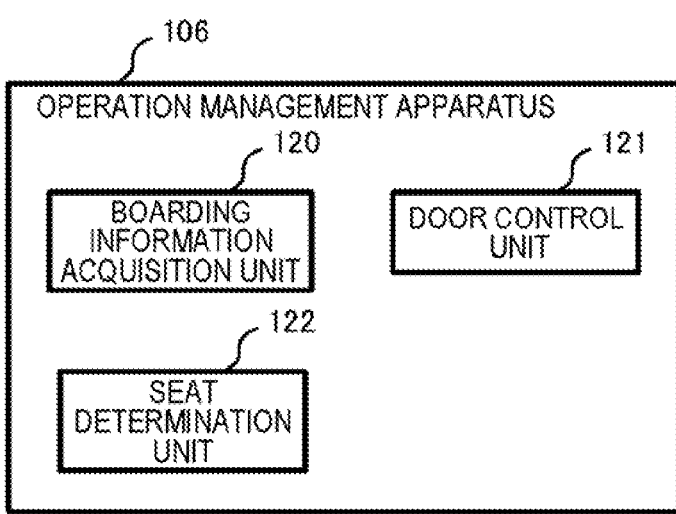
FIG. 5 is a diagram illustrating an example of a functional configuration of an operation management apparatus according to the example embodiment 1 of the present invention.

FIG. 5 is a diagram illustrating an example of a functional configuration of the operation management apparatus 106 according to the present example embodiment.

As described above, the operation management apparatus 106 manages the operation of a bus, along with the server apparatus 102. The operation management apparatus 106 functionally includes a boarding information acquisition unit 120, a door control unit 121, and a seat determination unit 122, as illustrated in FIG. 5.

The boarding information acquisition unit 120 acquires boarding information. Boarding information includes face information as biometric information of a user, and boarding place information, as described above, and face information is generated by the camera 103 by capturing an image of the user when the user boards a bus.

Note that the camera 103 is an example of a generation means for generating face information. As described above, face information is an example of biometric information, and biometric information may be iris information, fingerprint information, palm print information, or the like; and a generation means based on biometric information, such as a sensor generating biometric information, is preferably equipped on a bus.

The door control unit 121 controls the lock mechanism 104. For example, when a bus is traveling, the door control unit 121 sets the lock mechanism 104 to the locked state.

Specifically, the door control unit 121 receives a determination result from the authentication unit 113. When the determination result indicates a match, (that is, when a match is determined by the authentication unit 113), the door control unit 121 enables the door to be opened by driver operation or user operation by setting the lock mechanism 104 to the unlocked state. When the determination result indicates a mismatch (that is, when a mismatch is determined by the authentication unit 113), the door control unit 121 causes the lock mechanism 104 to maintain the unlocked state.

When a match is determined by the authentication unit 113, the seat determination unit 122 determines a seat of the user in the bus and causes the provision unit 105 to provide the position of the determined seat.

Specifically, the seat determination unit 122 receives a determination result from the authentication unit 113. Note that either one of the door control unit 121 and the seat determination unit 122 may receive a determination result from the authentication unit 113, and the other may acquire the determination result from the one receiving the determination result.

When the determination result indicates a match (that is, when a match is determined by the authentication unit 113), the seat determination unit 122 determines a seat of a user in a bus. Then, the seat determination unit 122 causes the provision unit 104 to provide the determined seat.

For example, by using seat identification information indicating a number preassigned to each seat in a bus, the provision unit 104 may provide a seat of a user by displaying seat identification information based on the seat of the user. Further, for example, the provision unit 104 may provide a seat of a user by a method of, for example, blinking the seat of the user on a seat layout diagram of a bus, under control of the seat determination unit 122. Furthermore, for example, the provision unit 104 may be a lamp provided above each seat, and a seat of a user may be provided by blinking or lighting the provision unit 104 associated with the seat of the user, under control of the seat determination unit 122.

Note that the provision unit 105 has only to provide a seat to a user and may be a display or the like included in the user terminal 101. In this case, by transmitting information indicating a determined seat to the user terminal 101, the seat determination unit 122 may cause the provision unit 105 in the user terminal 101 to display the seat of the user.

Physical Configuration of Operation Management System 100

From here onward, physical configurations of the user terminal 101, the server apparatus 102, and the operation management apparatus 106 will be described.

Figure 6:
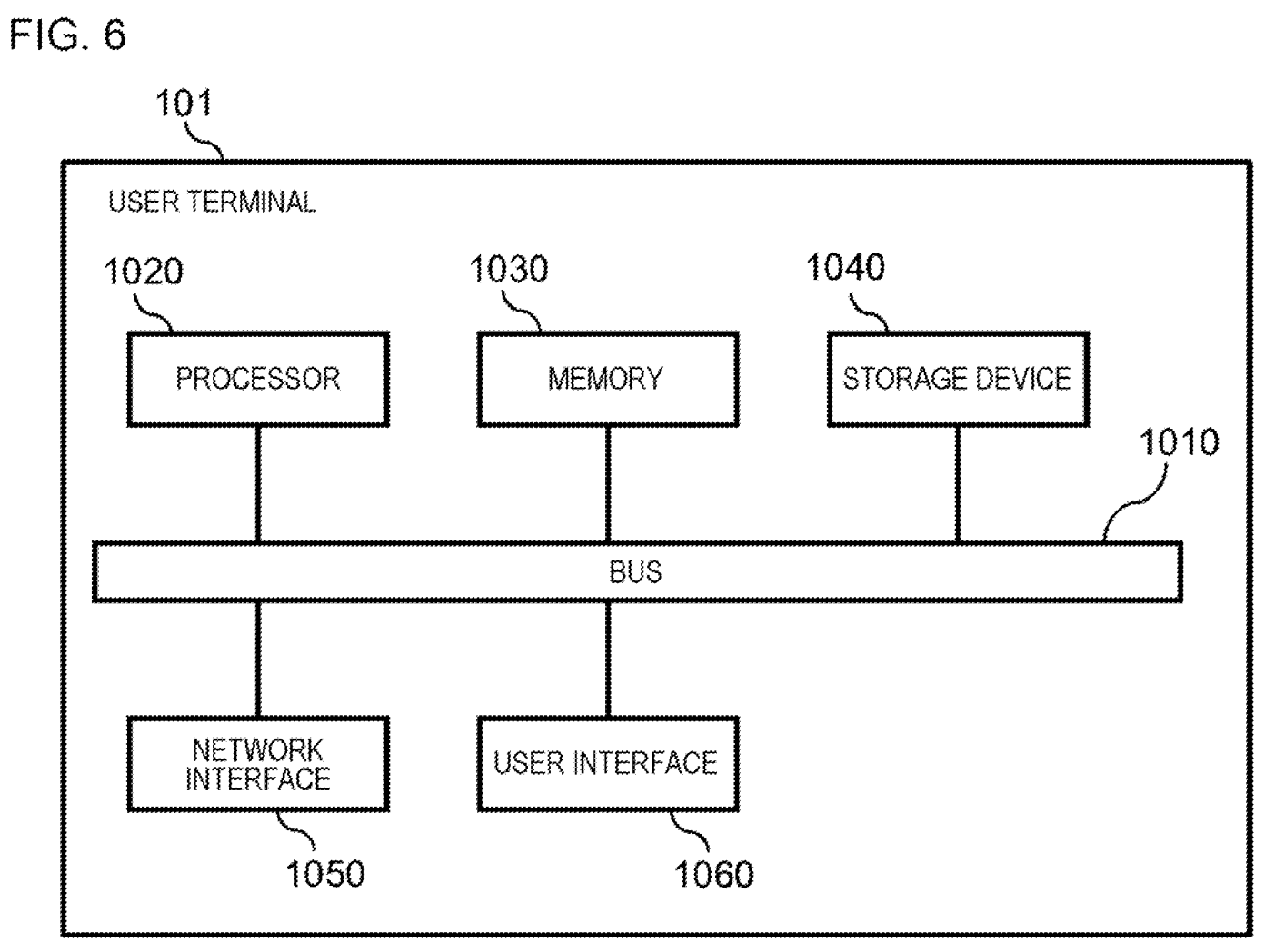

For example, the user terminal 101 is physically a smartphone or a tablet terminal and includes a bus 1010, a processor 1020, a memory 1030, a storage device 1040, a network interface 1050, and a user interface 1060, as illustrated in FIG. 6.

The bus 1010 is a data transmission channel for the processor 1020, the memory 1030, the storage device 1040, the network interface 1050, and the user interface 1060 to transmit and receive data to and from each other. Note that the method for interconnecting the processor 1020 and other components is not limited to a bus connection.

The processor 1020 is a processor provided by a central processing unit (CPU), a graphics processing unit (GPU), or the like.

The memory 1030 is a main storage provided by a random-access memory (RAM) or the like.

The storage device 1040 is an auxiliary storage provided by a hard disk drive (HDD), a solid-state drive (SSD), a memory card, a read-only memory (ROM), or the like.

Further, the storage device 1040 stores a program module for providing a function of the user terminal 101. By reading each program module into the memory 1030 and executing the program module by the processor 1020, each function related to the program module is provided.

The network interface 1050 is an interface for connecting the user terminal 101 to the network N.

The user interface 1060 is an interface for inputting information from a user and an interface for providing information to a user, examples of the interfaces including a mouse, a keyboard, a touch sensor, a camera and a scanner for user input, and a liquid crystal display for display of information.

Thus, the function of the user terminal 101 can be provided by executing a software program in cooperation with the physical components. Therefore, the present invention may be provided as a software program (hereinafter also simply referred to as a "program") or may be provided as a non-transitory storage medium on which the program is recorded.

For example, the server apparatus 102 is physically a general-purpose computer and includes a bus 2010, a processor 2020, a memory 2030, a storage device 2040, a network interface 2050, and a user interface 2060, as illustrated in FIG. 7.

The bus 2010, the processor 2020, the memory 2030, the storage device 2040, the network interface 2050, and the user interface 2060 are similar to the bus 1010, the processor 1020, the memory 1030, the storage device 1040, the network interface 1050, and the user interface 1060 that are described above, respectively. Therefore, detailed description of the bus 2010, the processor 2020, the memory 2030, the storage device 2040, the network interface 2050, and the user interface 2060 is omitted.

The storage device 2040 in the server apparatus 102 also stores a program module for providing a function of the server apparatus 102. By reading each program module into the memory 2030 and executing the program module by the processor 2020, each function related to the program module is provided.

Thus, the function of the server apparatus 102 can be provided by executing a software program in cooperation with the physical components. Therefore, the present invention may be provided as a program or as a non-transitory storage medium on which the program is recorded.

Figure 8:
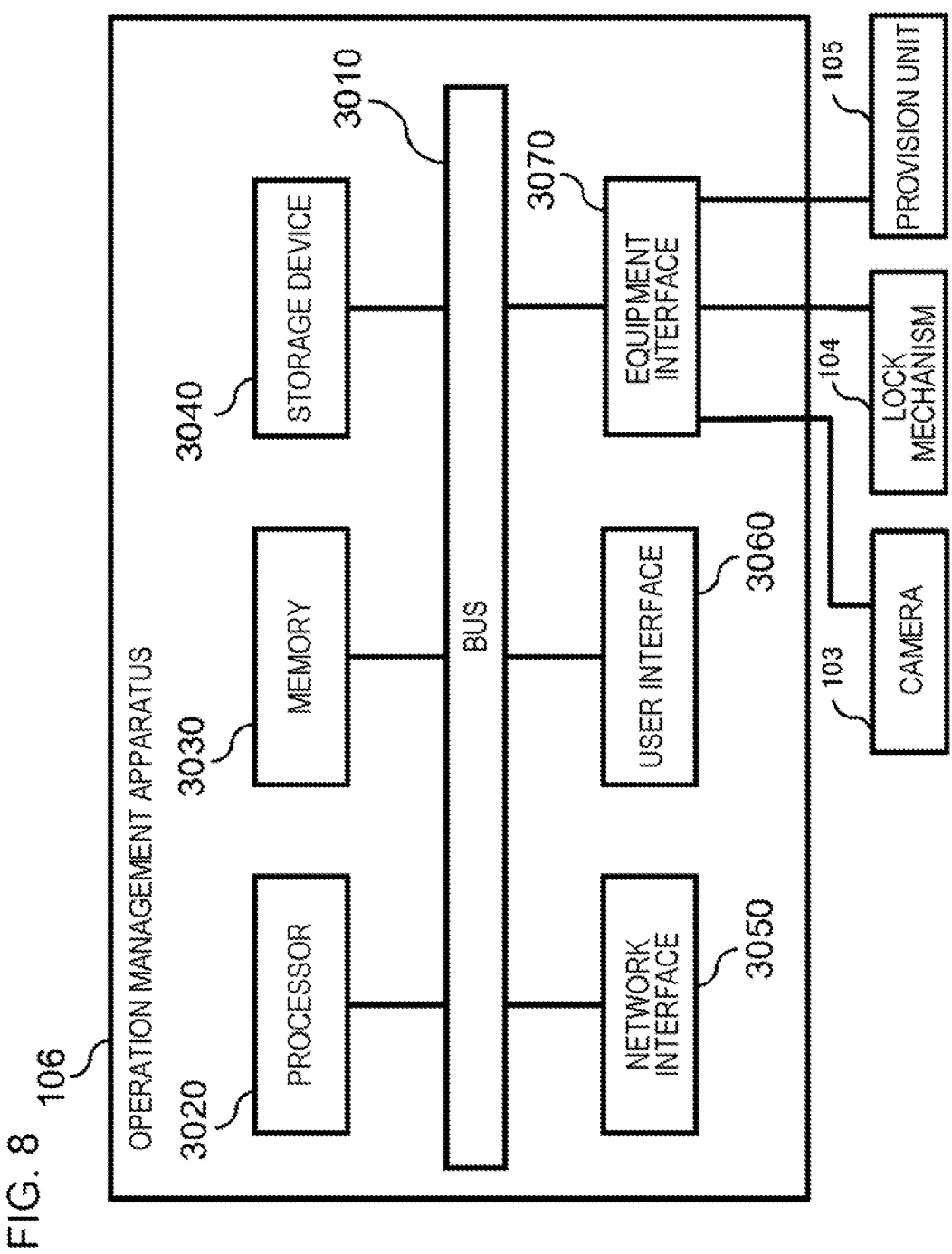
FIG. 8 is a diagram illustrating an example of a physical configuration of the operation management apparatus according to the example embodiment 1 of the present invention.

For example, the operation management apparatus 106 may physically be a smartphone or a tablet terminal and may be a computer equipped on a bus. The operation management apparatus 106 physically includes a bus 3010, a processor 3020, a memory 3030, a storage device 3040, a network interface 3050, a user interface 3060, and an equipment interface 3070, as illustrated in FIG. 8.

The bus 3010, the processor 3020, the memory 3030, the storage device 3040, the network interface 3050, and the user interface 3060 are similar to the bus 1010, the processor 1020, the memory 1030, the storage device 1040, the network interface 1050, and the user interface 1060 that are described above. Therefore, detailed description of the bus 3010, the processor 3020, the memory 3030, the storage device 3040, the network interface 3050, and the user interface 3060 is omitted.

The equipment interface 2070 is an interface for transmitting and receiving information to and from the camera 103, the lock mechanism 104, and the provision unit 105 that are pieces of equipment equipped on a bus.

The storage device 3040 in the operation management apparatus 106 also stores a program module for providing a function of the operation management apparatus 106. By reading each program module into the memory 3030 and executing the program module by the processor 3020, each function related to the program module is provided.

Thus, the function of the operation management apparatus 106 can be provided by executing a software program in cooperation with the physical components. Therefore, the present invention may be provided as a program or as a non-transitory storage medium on which the program is recorded.

Operation of Operation Management System 100

From here onward, the operation of the operation management system 100 according to the present example embodiment will be described with reference to diagrams.

Figure 9:
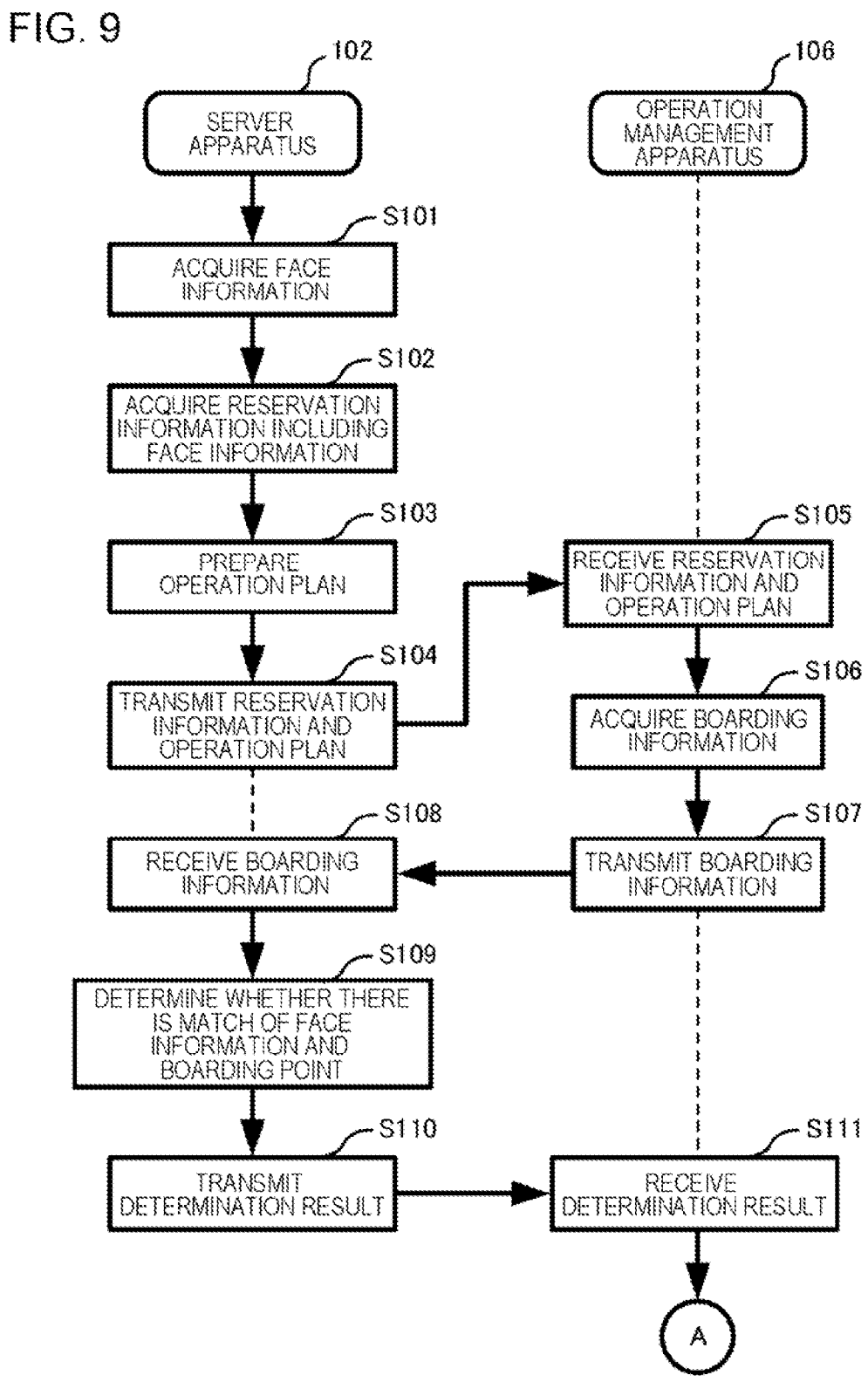
FIG. 9 is a diagram illustrating an example of a flow of operation management processing according to the example embodiment 1 of the present invention.
Figure 10:
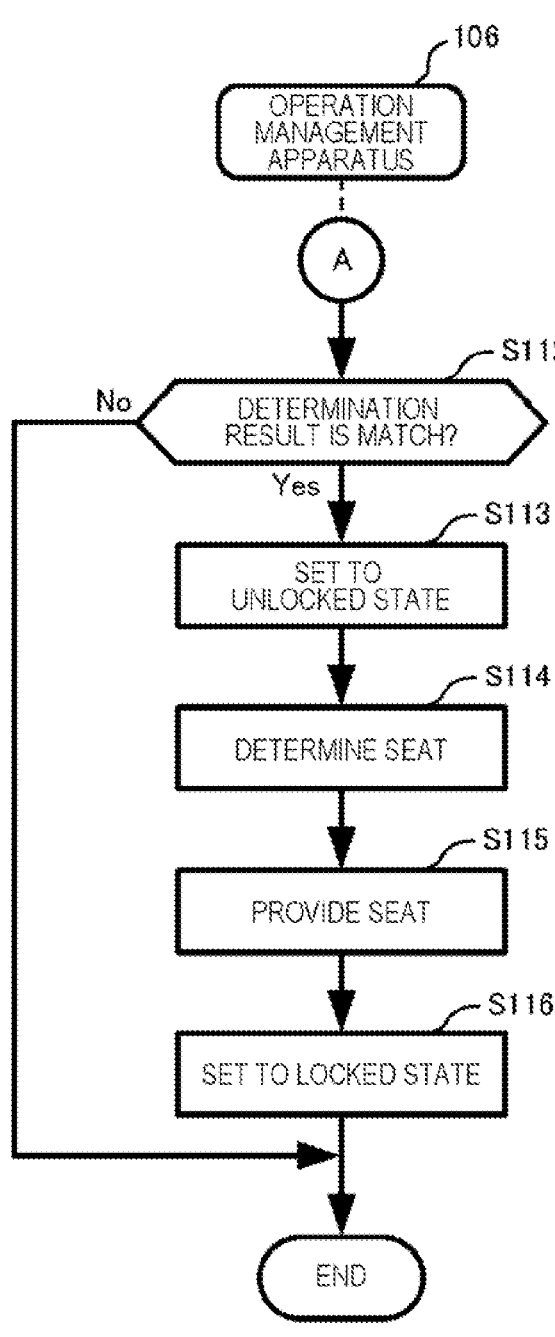
FIG. 10 is a diagram illustrating an example of the flow of the operation management processing according to the example embodiment 1 of the present invention.

FIGS. 9 and 10 are diagrams illustrating an example of a flow of operation management processing according to the example embodiment 1 of the present invention. The operation management processing is processing for providing an on-demand type transportation service and is particularly suitable for managing operation of a vehicle such as an on-demand type bus. For example, the operation management processing is started by reception of request information transmitted from the user terminal 101 by the server apparatus 102.

FIG. 9 is referred to.

The reservation acceptance unit 111 refers to the user information 110a and acquires face information associated with user identification information included in the request information (Step S101).

The reservation acceptance unit 111 acquires reservation information including the face information acquired in Step S101, and a boarding point, a disembarkation point, and at least one of a scheduled boarding time and a scheduled disembarkation time, the points and the times being included in the request information (Step S102).

The planning unit 112 prepares an operation plan of a bus, based on the reservation information acquired in Step S102 (Step S103).

The operation plan includes points where a user boards and disembarks, an operation route passing through the points, and a scheduled arrival time and a scheduled start time at the each point. When another user makes a boarding reservation for a bus reserved by the user or is boarded on the bus, an operation route based on a boarding point, a scheduled boarding time, a disembarkation point, and a scheduled disembarkation time that are included in reservation information of the another user is prepared.

The planning unit 112 transmits the reservation information acquired in Step S102 and the operation plan prepared in Step S103 to the operation management apparatus 106 through the network N (Step S104).

At this time, the planning unit 112 preferably transmits the boarding point, the scheduled boarding time, the disembarkation point, and the scheduled disembarkation time of the user included in the operation plan also to the user terminal 101 of the user.

The boarding information acquisition unit 120 receives, through the network N, the reservation information and the operation plan that are transmitted in Step S104 (Step S105). The reservation information and the operation plan received here are applied to the actual bus operation. Specifically, the bus driver operates the bus in accordance with the received reservation information and the received operation plan.

When arriving at the boarding point included in the reservation information received in Step S105, the boarding information acquisition unit 120 acquires boarding information (Step S106).

The boarding information acquisition unit 120 may acquire the current position of the bus by, for example, an unillustrated Global Positioning System (GPS) receiver equipped on the bus. When determining that the current position is close to the boarding point, that is, when arriving at the boarding point of the user, the boarding information acquisition unit 120 generates boarding place information indicating the boarding position.

Further, when acquiring face information acquired by capturing, in response to driver operation or the like, an image of the face of the user before boarding by the camera 103, the boarding information acquisition unit 120 acquires boarding information by generating information including the acquired face information and the generated boarding place information.

The boarding information acquisition unit 120 transmits the boarding information acquired in Step S106 to the server apparatus 102 through the network N (Step S107).

The authentication unit 113 receives, through the network N, the boarding information transmitted in Step S107 (Step S108).

The authentication unit 113 determines whether there is a match of the face information and the boarding point that are included in each piece of the reservation information acquired in Step S102 and the boarding information received in Step S108 (Step S109).

The authentication unit 113 transmits the determination result in Step S109 to the operation management apparatus 106 through the network N (Step S110).

The door control unit 121 receives, through the network N, the determination result transmitted in Step S110 (Step S11).

FIG. 10 is referred to.

The door control unit 121 determines whether the determination result received in Step S11 is a match (Step S112).

When determining that the determination result is no match (Step S112: No), the door control unit 121 ends the operation management processing.

Note that when determining that the determination result is no match (Step S112: No), the door control unit 121 may perform the processing after receiving confirmation of the driver or the like by, for example, providing a face image of the user scheduled to board at the boarding point to the driver. In this case, the door control unit 121 preferably receives an instruction about whether to board a person boarding the bus from the driver confirming whether the person matches a person making the reservation and ends the operation management processing when the instruction is not to board the person. Further, when the instruction is to board the person, the door control unit 121 preferably sets the lock mechanism 104 of the door to the unlocked state, similarly to Step S113 to be described later.

The case of the determination result indicating no match refers to a case of at least either of the boarding place information and the face information being different between the reservation information and the boarding information, which is caused by either a user boarding at an incorrect boarding point different from the reservation or letting an incorrect person different from the user board the bus at the boarding point reserved by the user.

Assuming the case of letting the user board the bus at an incorrect boarding point, the user may not be able to board at the place preferred by the user at the time of reservation as a result of the operation related to the reservation of the user being handled as completed. Further, assuming the case of letting an incorrect person board the bus, the user originally making the reservation may not be able to board at the boarding point as a result of the operation related to the reservation at the boarding point being handled as completed.

The present example embodiment enables confirmation that a user is surely the person himself or herself making a reservation (personal authentication), based on whether there is a match of a boarding point and face information between reservation information and boarding information. Therefore, incorrect boarding being boarding a user at an incorrect place or boarding an incorrect person can be prevented.

In order to prevent such incorrect boarding, personal authentication by issuing a code (such as a number) or the like at the time of reservation and confirming the code of a user by a driver at the time of boarding may be considered.

However, such a method generally requires a user to carry a mobile terminal or card holding a code, paper on which a code is written, or the like for boarding a bus, which causes inconvenience of carrying such an item to the user. Further, in this method, a mistake in confirmation may occur, and therefore a burden on a driver confirming a code is heavy.

Further, personal authentication by the name of a user may be considered. However, this method requires telling the name in a public place, which is undesirable in terms of privacy.

On the other hand, since personal authentication is performed by using face information, according to the present example embodiment, only image capture of a user by the camera 103 is required, and personal authentication can be performed easily, promptly, and accurately; and therefore, incorrect boarding can be prevented more reliably than in the past. Accordingly, user convenience can be improved.

When determining that the determination result indicates a match (Step S112: Yes), the door control unit 121 sets the lock mechanism 104 of the door to the unlocked state (Step S113).

The determination result indicating a match refers to a case of a person boarding the bus at the boarding point being the user making the reservation. Therefore, by setting the lock mechanism 104 of the door to the unlocked state, the door can be opened by driver operation or user operation, and the user can board the bus.

The seat determination unit 122 determines a seat of the user (Step S114).

At this time, for example, the seat determination unit 122 preferably determines a seat of the user in such a way that the seat is as distant from another passenger as possible. Thus, the user can be as separated from another passenger as possible, and therefore, the user can comfortably use the bus. Such seating also provides infection prevention particularly when an infectious disease is prevalent. Accordingly, user convenience can be improved.

The seat determination unit 122 causes the provision unit 104 to provide the position of the seat determined in Step S114 (Step S115).

Thus, the user can easily find a comfortable seat and sit in the seat. Accordingly, user convenience can be improved.

For example, when the user takes the seat provided in Step S115, the door control unit 121 sets the lock mechanism 104 of the door to the locked state in response to driver operation or the like (Step S116).

Thus, the door does not open during travel, which enables safe travel.

The door control unit 121 ends the operation management processing.

The example embodiment 1 of the present invention has been described thus far.

According to the example embodiment 1, reservation information including face information as biometric information of a user making a boarding reservation for a bus, and a boarding point is acquired, and boarding information including face information of a user generated by the camera 103 equipped on the bus and boarding place information indicating a boarding point is acquired. Then, whether there is a match of the face information and the boarding point that are included in each piece of the reservation information and the boarding information is determined.

Thus, incorrect boarding can be more reliably prevented than in the past, as described above. Accordingly, user convenience can be improved.

The operation management apparatus 106 according to the present example embodiment includes the door control unit 121 controlling the lock mechanism 104, based on a determination result by the authentication unit 113.

Thus, boarding a user at an incorrect place or boarding an incorrect person due to a driver mistakenly opening a door can be prevented; and therefore, incorrect boarding can be reliably prevented. Accordingly, user convenience can be improved.

Modified Example 1

An open-close mechanism automatically opening and closing a door may be equipped on a bus in place of the lock mechanism 104, and the door control unit 121 may control the open-close mechanism. In this case, the door control unit 121 preferably opens the door when a match is determined by the authentication unit 113 and keeps the door closed when no match is determined by the authentication unit 113. The above can also reliably prevent incorrect boarding, similarly to the door control unit 121 controlling the lock mechanism 104 as is the case in the example embodiment 1. Accordingly, user convenience can be improved.

Modified Example 2

In order to confirm safety of a user, user information 110*b* replacing the user information 110*a* may be stored in the user storage unit 110, and a server apparatus 202 replacing the server apparatus 102 may further include a person-to-be-confirmed output unit 230.

Figure 11:
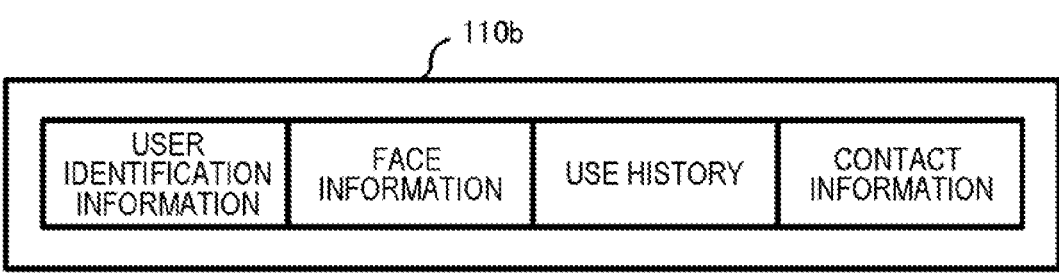
FIG. 11 is a diagram illustrating an example of a structure of user information according to a modified example 2.

FIG. 11 illustrates an example of a structure of the user information 110*b* according to this modified example, and a use history and contact information of a user are associated in addition to user identification information and face information similar to those according to the example embodiment 1, in the user information 110*b*. Use history is information indicating a use history of an on-demand type transportation service. Contact information is information indicating an address, a phone number, and the like of a user.

Figure 12:
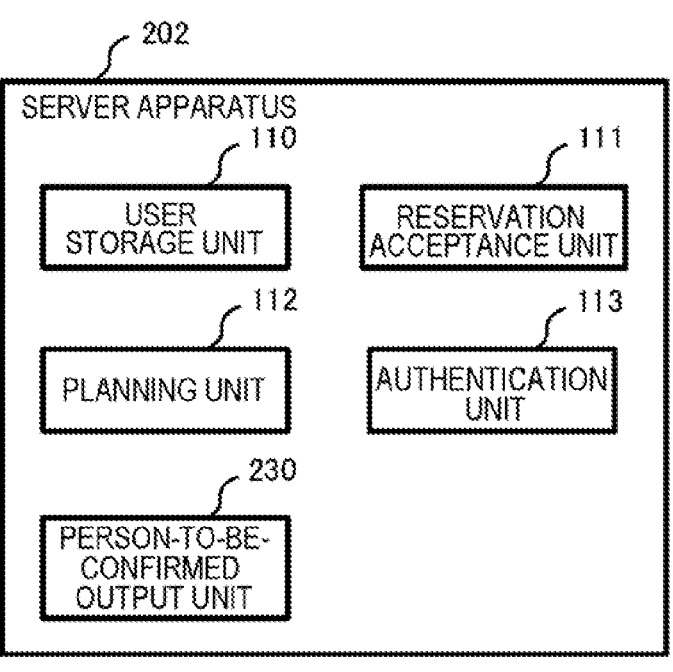
FIG. 12 is a diagram illustrating an example of a functional configuration of a server apparatus according to the modified example 2.

FIG. 12 is a diagram illustrating an example of a functional configuration of the server apparatus 202 according to this modified example. The server apparatus 202 further includes the person-to-be-confirmed output unit 230 in addition to the functional units 110 to 113 included in the server apparatus 201 according to the example embodiment 1.

The person-to-be-confirmed output unit 230 outputs safety confirmation information, based on the user information 110*b*. Safety confirmation information is information indicating a user not making a reservation for a bus for a predetermined period or longer.

For example, safety confirmation information is a list of users not making a reservation for a bus for a predetermined period or longer on the basis of a date specified by the user. The person-to-be-confirmed output unit 230 causes the list included in the safety confirmation information to be displayed on a screen (such as a liquid crystal display included in the user interface 2060) or be printed by a printer (unillustrated) connected through the network N.

A user not making a reservation for a bus for the predetermined period may be in a poor state of health. By referring to safety confirmation information, safety confirmation of such a user can be performed. Thus, safety of the user can be confirmed by a method such as contacting contact information of the user by an administrator of the server apparatus 202. Accordingly, user convenience can be improved.

Modified Example 3

When a user making a boarding reservation is a user of a ticket allowing use of the vehicle within a predetermined area, the reservation acceptance unit 111 may acquire reservation information including a boarding point and a disembarkation point within the area.

Specifically, for example, the user terminal 101 preferably further acquires flag information indicating whether a user making a boarding reservation is a user of a ticket allowing unlimited use of a bus within a predetermined area. Then, the user terminal 101 preferably transmits request information further including the flag information to the server apparatus 102.

When a boarding point or a disembarkation point included in the request information is out of the area predetermined on the ticket, the reservation acceptance unit 111 preferably transmits notification for prompting correction of the request information to the user terminal 101. Further, when the boarding point or the disembarkation point included in the request information is within the area predetermined on the ticket, the reservation acceptance unit 111 preferably acquires reservation information, based on the request information.

Such a ticket is not limited to a paper ticket and may be a so-called digital ticket information of which is held in a smartphone or a tablet terminal.

This modified example can prevent a user holding a ticket allowing unlimited use of a bus within a predetermined area from unintentionally using a bus outside the area. Accordingly, user convenience can be improved.

Modified Example 4

An example of the user storage unit 110, the reservation acceptance unit 111, the planning unit 112, and the authentication unit 113 being included in the server apparatus 102 and the boarding information acquisition unit 120, the door control unit 121, and the seat determination unit 122 being included in the operation management apparatus 106 has been described in the example embodiment 1. However, the functional units 110 to 113 and 120 to 122 have only to be included in the operation management system 100. Specifically, a part or the whole of the functional units 110 to 113 included in the server apparatus 102 may be included in the operation management apparatus 106, and a part or the whole of the functional units 120 to 122 included in the operation management apparatus 106 may be included in the server apparatus 102, according to the example embodiment 1.

Figure 13:
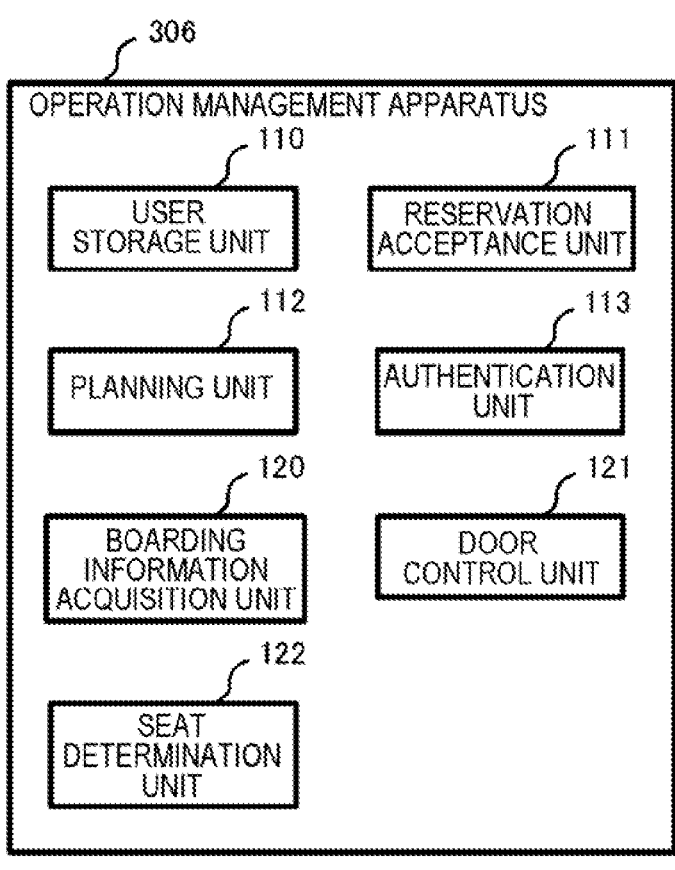
FIG. 13 is a diagram illustrating an example of a functional configuration of an operation management apparatus according to a modified example 4.

FIG. 13 is a diagram illustrating an example of a functional configuration of an operation management apparatus 306 according to a modified example 4. The operation management apparatus 306 functionally includes the user storage unit 110, the reservation acceptance unit 111, the planning unit 112, and the authentication unit 113 that are included in the server apparatus 102 according to the example embodiment 1 in addition to the boarding information acquisition unit 120, the door control unit 121, and the seat determination unit 122 that are included in the operation management apparatus 106 according to the example embodiment 1, as illustrated in FIG. 13.

This modified example also provides effects similar to those of the example embodiment 1.

Example Embodiment 2

An example of a prepared operation plan not being changed has been described in the example embodiment 1. However, an operation plan may be appropriately changed according to status after preparation and be proposed to a user. An example of an operation plan being changed according to status of a facility related to a reservation will be described in the present example embodiment.

Figure 14:
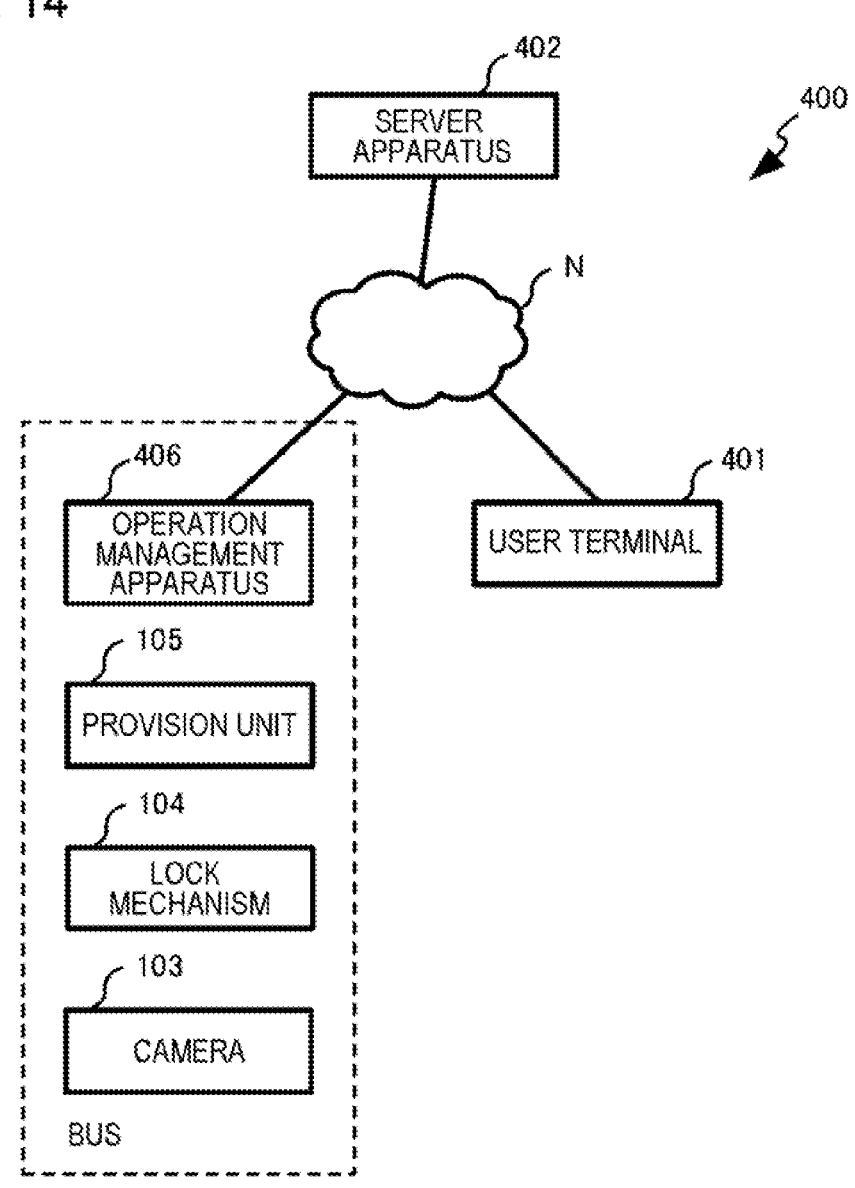
FIG. 14 is a diagram illustrating a configuration of an operation management system according to an example embodiment 2 of the present invention.

An operation management system 400 according to the present example embodiment includes a user terminal 401, a server apparatus 402, and an operation management apparatus 406 replacing the user terminal 101, the server apparatus 102, and the operation management apparatus 106 according to the example embodiment 1, respectively, as illustrated in FIG. 14. Except for the above, the operation management system 400 according to the present example embodiment is preferably configured similarly to the operation management system 100 according to the example embodiment 1.

The user terminal 401 receives confirmation information based on a changed operation plan from the server apparatus 402 through a network N. Confirmation information includes a boarding point, a scheduled boarding time, a disembarkation point, and a scheduled disembarkation time of a user that are based on a changed operation plan, and at least one of the scheduled boarding time and the scheduled disembarkation time is changed from that in the initial operation plan.

When receiving the received confirmation information, the user terminal 401 acquires approval/disapproval information indicating whether a user approves the content of the confirmation information and transmits the approval/disapproval information to the server apparatus 402 through the network N.

Except for the aforementioned points, the user terminal 401 is preferably configured similarly to the user terminal 101 according to the example embodiment 1.

Functional Configuration of Server Apparatus 402

Figure 15:
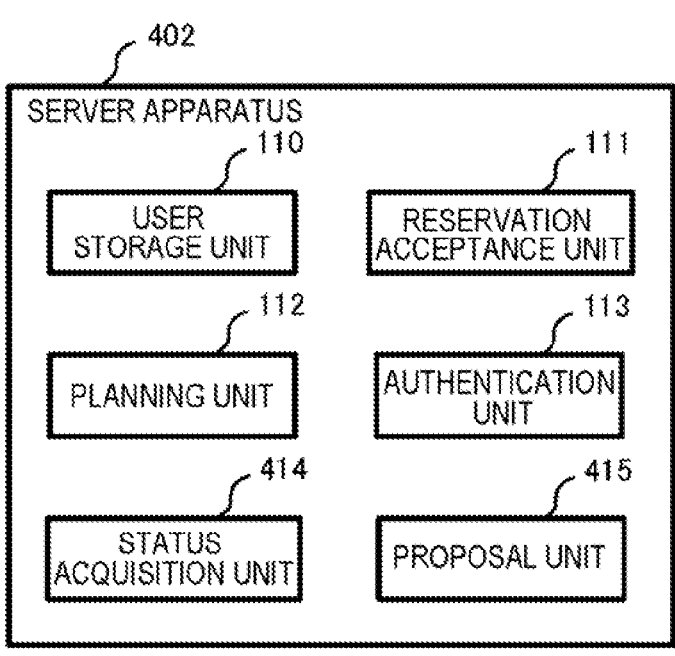
FIG. 15 is a diagram illustrating an example of a functional configuration of a server apparatus according to the example embodiment 2 of the present invention.

The server apparatus 402 further functionally includes a status acquisition unit 414 and a proposal unit 415, as illustrated in FIG. 15. Except for the above, the server apparatus 402 according to the present example embodiment is preferably configured similarly to the server apparatus 102 according to the example embodiment 1.

When a facility associated with at least one of a boarding point and a disembarkation point that are included in reservation information exists, the status acquisition unit 414 acquires status information indicating status of the facility.

For example, a facility associated with at least one of a boarding point and disembarkation point may be the facility when a user determines a boarding point or a disembarkation point by using a facility. For example, when a user determines a boarding point or a disembarkation point by using an address, the status acquisition unit 414 preferably determines, from map information or the like, a facility provided within a predetermined area from a point indicated by the address.

Status of a facility refers to congestion status of the facility or the like. When a facility is a hospital, examples of status of the facility include an actual medical examination being delayed from a reservation time, and a starting time from the hospital becoming later than scheduled due to an increased waiting time for checkout. Status of the facility in these cases is the delay time from the reservation time in the actual medical examination and the waiting time at the checkout.

The status acquisition unit 414 preferably acquires status information in real time from an apparatus (unillustrated) installed at a facility through a network. Further, the status acquisition unit 414 may acquire a reservation time of a user from electronic medical record information and acquire an estimated examination time acquired by estimating an actual examination time. For example, an estimated examination time is a time acquired by adding a current delay time occurring in a medical examination to a reservation time.

Based on status information acquired by the status acquisition unit 414, the proposal unit 415 prepares an operation plan in which at least one of a scheduled boarding time and a scheduled disembarkation time is changed. The proposal unit 415 acquires confirmation information including a scheduled boarding time and a scheduled disembarkation time that are based on the changed operation plan. Note that a boarding point and a disembarkation point do not need to be changed.

By transmitting the confirmation information to the user terminal 401, the proposal unit 415 performs processing for proposing the scheduled boarding time and the scheduled disembarkation time that are based on the operation plan after the change to a user. In accordance with approval/disapproval information from the user terminal 401 responding to the proposal, the proposal unit 415 determines an operation plan applied to an actual bus to be the operation plan either before the change or after the change.

Specifically, when receiving approval/disapproval information indicating approval of the changed operation plan, the proposal unit 415 determines the operation plan after the change to be the operation plan applied to the actual bus and transmits the operation plan after the change to the operation management apparatus 405 through the network N. Further, when receiving approval/disapproval information indicating disapproval of the changed operation plan, the proposal unit 415 determines the operation plan before the change to be the operation plan applied to the actual bus.

Functional Configuration of Operation Management Apparatus 406

Figure 16:
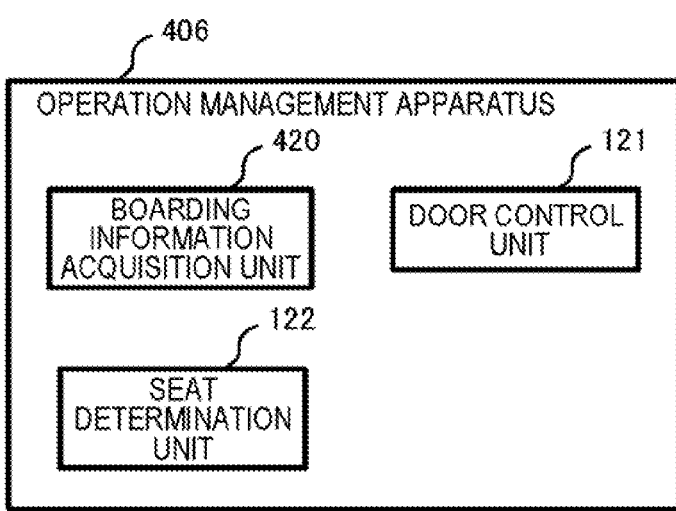
FIG. 16 is a diagram illustrating an example of a functional configuration of an operation management apparatus according to the example embodiment 2 of the present invention.

The operation management apparatus 406 functionally includes a boarding information acquisition unit 420 replacing the boarding information acquisition unit 120, as illustrated in FIG. 16. Except for this point, the operation management apparatus 406 according to the present example embodiment is preferably configured similarly to the operation management apparatus 106 according to the example embodiment 1.

When an operation plan is changed in the server apparatus 402, the boarding information acquisition unit 420 receives the operation plan after the change from the server apparatus 402 through the network N. Then, the boarding information acquisition unit 420 changes an operation plan applied to the actual bus operation to the operation plan after the change.

Except for this point, the boarding information acquisition unit 420 is preferably configured similarly to the boarding information acquisition unit 120 according to the example embodiment 1.

Physical Configuration of Operation Management System 400

Preferably, the user terminal 401, the server apparatus 402, and the operation management apparatus 406 are physically configured similarly to the user terminal 101, the server apparatus 102, and the operation management apparatus 106 according to the example embodiment 1, respectively. For simplification of description, detailed description of the physical configurations of the user terminal 401, the server apparatus 402, and the operation management apparatus 406 is omitted.

Operation of Operation Management System 400

From here onward, the operation of the operation management apparatus system 400 according to the present example embodiment will be described with reference to diagrams.

Figure 17:
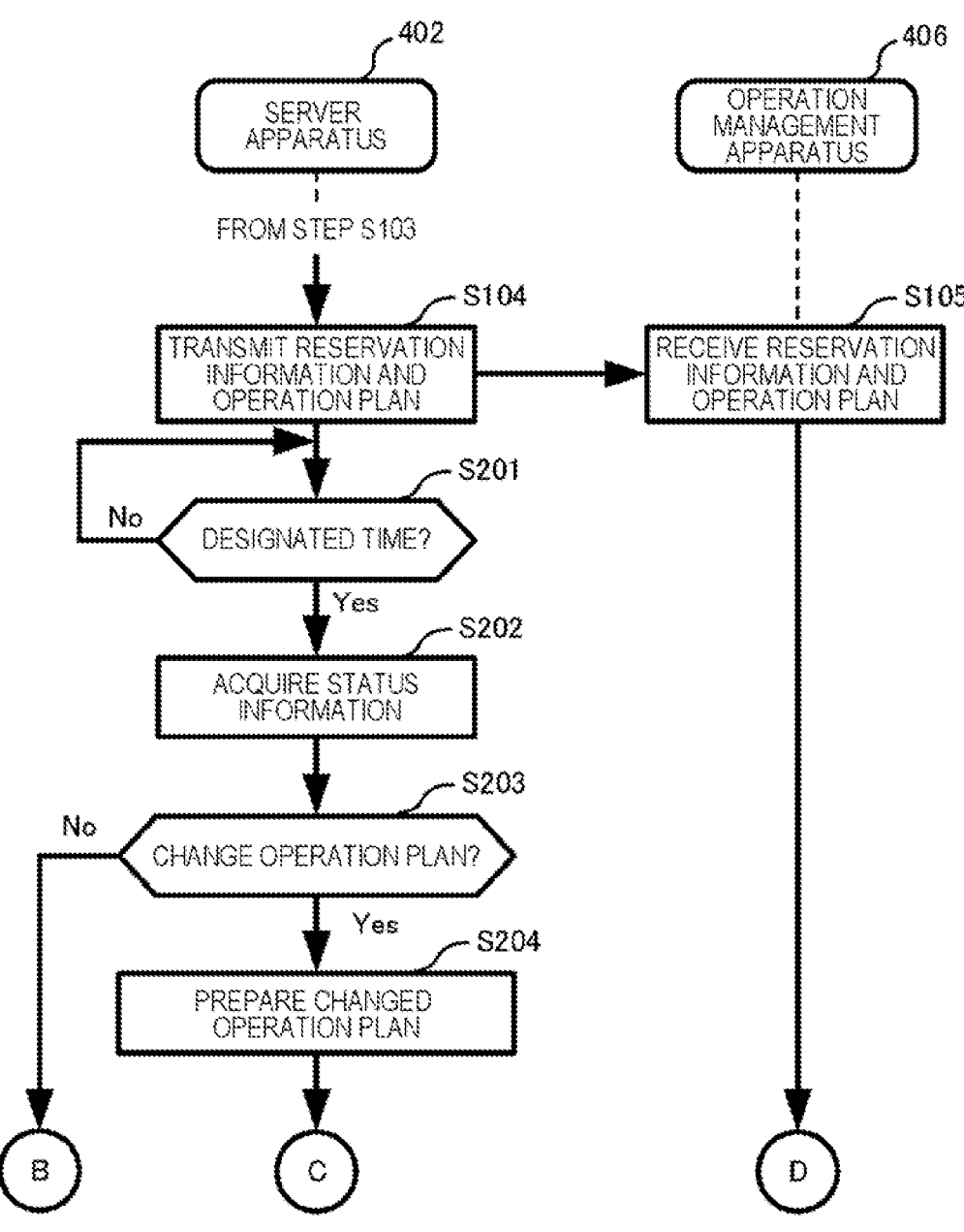
FIG. 17 is a diagram illustrating an example of a flow of operation management processing according to the example embodiment 2 of the present invention.
Figure 18:
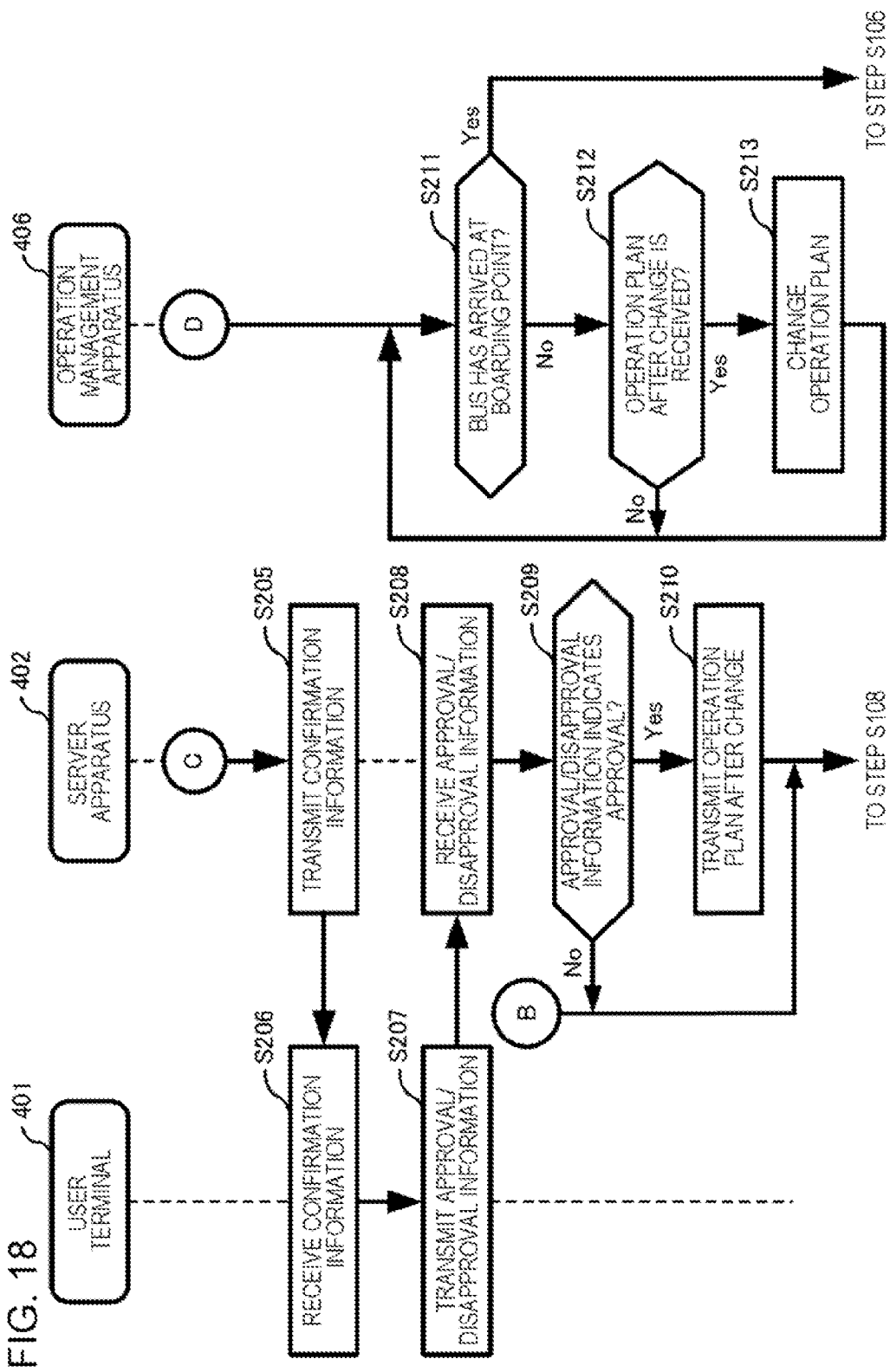
FIG. 18 is a diagram illustrating an example of the flow of the operation management processing according to the example embodiment 2 of the present invention.

FIGS. 17 and 18 are diagrams illustrating an example of a flow of operation management processing according to the example embodiment 2 of the present invention. Note that processing in Steps S106 to S116 according to the present example embodiment is similar to that according to the example embodiment 1, and therefore illustration thereof is omitted in FIG. 17 and FIG. 18.

FIG. 17 is referred to.

Processing in Steps S103 to S105 similar to that according to the example embodiment 1 is executed.

Following the processing in Step S104, the status acquisition unit 414 in the server apparatus 104 determines whether the current time is a designated time (Step S201).

The designated time is a time preset by the status acquisition unit 414 as a time at which status information is acquired and for example, is set to a predetermined time before a scheduled disembarkation time such as an hour before a scheduled disembarkation time included in reservation information.

When determining that the current time is not the designated time (Step S201: No), the status acquisition unit 414 continues the processing in Step S201. When determining that the current time is the designated time (Step S201: Yes), the status acquisition unit 414 acquires status information (Step S202).

Note that, for example, the status acquisition unit 414 may acquire medical record information along with status information and transmit the medical record information to the operation management apparatus 406. Thus, the bus driver can learn emergency contact information, a medical history, a medicine being taken, and the like of a user that are included in the medical record information and can suitably cope with an emergency such as a case of the condition of the user deteriorating in the bus. Accordingly, user convenience can be improved.

The proposal unit 415 determines whether to change an operation plan prepared in Step S103, based on the status information acquired in Step S202 (Step S203).

When determining not to change the operation plan (Step S103: No), the proposal unit 415 performs processing in Step S108 similar to that according to the example embodiment 1 (see FIG. 18).

For example, when the status information indicates that, in a hospital being a disembarkation point, a 60-minute delay is not occurring or a delay occurring in the hospital is shorter than a predetermined time, the proposal unit 415 determines not to change the operation plan.

FIG. 17 is referred to again.

When determining to change the operation plan (Step S103: Yes), the proposal unit 415 prepares a changed operation plan (Step S204).

For example, when the status information indicates that, in a hospital being a disembarkation point, a delay (such as 60 minutes) equal to or greater than a predetermined time is occurring, the proposal unit 415 determines to change the operation plan. Then, the proposal unit 415 prepares an operation plan based on the delay indicated by the status information.

Specifically, for example, when a delay occurring in the hospital is 60 minutes, the scheduled disembarkation time is set to be 60 minutes later than that in the operation plan prepared in Step S103 in the operation plan after the change. Further, the scheduled start time is changed to a time acquired by subtracting the time required to travel to the start point from the scheduled disembarkation time after the change in the operation plan after the change.

Note that while an example of both the scheduled disembarkation time and the scheduled start time are changed in the operation plan after the change has been described, at least one of the scheduled disembarkation time and the scheduled start time has only to be changed.

FIG. 18 is referred to.

The proposal unit 415 generates confirmation information including a scheduled disembarkation time and a scheduled start time in the operation plan prepared in Step S204, and a disembarkation point and a start point being points related to the aforementioned times, respectively. Then, the proposal unit 415 transmits the confirmation information to the user terminal 401 (Step S205).

The user terminal 401 receives, through the network N, the confirmation information transmitted in Step S205. The user terminal 401 displays the received confirmation information and accepts input based on whether to approve the content from the user. Thus, the user terminal 401 generates approval/disapproval information based on the user input and transmits the information to the server apparatus 402 (Step S207).

The proposal unit 415 receives, through the network N, the approval/disapproval information transmitted in Step S207 (Step S208). The proposal unit 415 determines whether the approval/disapproval information received in Step S208 indicates approval of the user (Step S209).

When determining that the information does not indicate approval (Step S209: No), the proposal unit 415 performs processing in Step S108 similar to that according to the example embodiment 1. When determining that the information indicates approval (Step S209: Yes), the proposal unit 415 transmits the operation plan after the change prepared in Step S204 to the operation management apparatus 406 (Step S210) and performs the processing in Step S108 similar to that according to the example embodiment 1.

On the other hand, after executing processing in Step S105 similar to that according to the example embodiment 1 (see FIG. 17), the boarding information acquisition unit 420 in the operation management apparatus 406 determines whether the bus has arrived at a boarding point (Step S211), as illustrated in FIG. 18.

When determining that the bus has arrived at the boarding point (Step S211: Yes), the boarding information acquisition unit 420 performs processing in Step S106 similar to that according to the example embodiment 1. When determining that the bus has not arrived at the boarding point (Step S211: No), the boarding information acquisition unit 420 determines whether operation information after the change is received (Step S212).

When the processing in Step S210 is not performed in the server apparatus 402, the boarding information acquisition unit 420 does not receive the operation plan after the change. Therefore, the boarding information acquisition unit 420 determines that the operation information after the change is not received in this case.

On the other hand, when the processing in Step S210 is performed in the server apparatus 402, the boarding information acquisition unit 420 receives, through the network N, the operation plan after the change transmitted in Step S210. Therefore, the boarding information acquisition unit 420 determines that the operation information after the change is received in this case.

When determining that the operation information after the change is not received (Step S212: No), the boarding information acquisition unit 420 performs the processing in Step S211 again. Specifically, the boarding information acquisition unit 420 stands by for reception of the operation information after the change until the bus arrives at the boarding point.

When determining that the operation information after the change is received (Step S212: Yes), the boarding information acquisition unit 420 changes an operation plan in the bus to the operation plan after the change received from the server apparatus 402 (Step S213).

Thus, the reservation information received in Step S105 and the operation plan after the change received in response to the transmission in Step S210 are applied to the actual bus operation. Specifically, the bus driver operates the bus in accordance with the reservation information received in Step S105 and the operation plan after the change.

After the processing in Step S213, the boarding information acquisition unit 420 performs the processing in Step S211 again.

The example embodiment 2 of the present invention has been described thus far.

The example embodiment 2 provides effects similar to those provided by the example embodiment 1.

Further, according to the present example embodiment, processing for acquiring status information indicating status of a facility, changing, based on the acquired status information, at least one of a scheduled boarding time and a scheduled disembarkation time that are included in an operation plan prepared by the planning unit 112, and proposing the changed plan to a user is performed.

Thus, an operation plan based on status of the facility can be prepared, and therefore, for example, a waiting time of the user can be reduced. Accordingly, user convenience can be improved.

While the example embodiments of the present invention and the modified examples thereof have been described above, the present invention is not limited to these example embodiments and modified examples. For example, example embodiments acquired by appropriately combining a part or the whole of the example embodiments and the modified examples thereof that are described above and example embodiments with appropriate changes to such example embodiments are also included in the present invention.

The whole or part of the means according to the example embodiments disclosed above may also be described as, but not limited to, the following supplementary notes.

1. An operation management system including:
   a reservation acceptance means for acquiring reservation information including biometric information of a user making a boarding reservation for a vehicle, and a boarding point;
   a boarding information acquisition means for acquiring boarding information including biometric information of the user generated by a generation means equipped on the vehicle and boarding place information indicating the boarding point; and
   an authentication means for determining whether there is a match of biometric information and a boarding point that are included in each piece of the reservation information and the boarding information.

2. The operation management system according to aforementioned 1, wherein
   the reservation information further includes a disembarkation point of the user and at least one of a scheduled boarding time and a scheduled disembarkation time, and the operation management system further includes a planning means for preparing an operation plan of the vehicle, based on the reservation information.

3. The operation management system according to aforementioned 2, further including:

a status acquisition means for, when a facility associated with at least one point out of the boarding point and the disembarkation point exists, acquiring status information indicating status of the facility; and a proposal means for performing processing for changing, based on the acquired status information, at least one of a scheduled boarding time and a scheduled disembarkation time that are included in an operation plan prepared by the planning means and proposing the changed plan to the user.

4. The operation management system according to aforementioned 2 or 3, further including an operation management apparatus equipped on the vehicle, wherein the planning means transmits the operation plan to the operation management apparatus.

5. The operation management system according to aforementioned 4, wherein the authentication means transmits a result of determination to the operation management apparatus.

6. The operation management system according to any one of aforementioned 1 to 3, further including an operation management apparatus equipped on the vehicle, wherein the operation management apparatus includes a door control means for, based on a result of determination by the authentication means, controlling a lock mechanism changing openability of a door of the vehicle or an open-close mechanism opening and closing the door.

7. The operation management system according to any one of aforementioned 1 to 3, further including:

an operation management apparatus equipped on the vehicle; and a provision means for providing information to a user, the means being equipped on the vehicle, wherein the operation management apparatus includes a seat determination means for, when a match is determined by the authentication means, determining a seat of the user in the vehicle and causing the provision means to provide a position of the determined seat.

8. The operation management system according to any one of aforementioned 1 to 7, further including a person-to-be confirmed output means for, based on user information including a use history of the user, outputting safety confirmation information indicating a user not making a reservation for a vehicle for a predetermined period or longer.

9. The operation management system according to any one of aforementioned 1 to 8, wherein, when a user making the boarding reservation is a user of a ticket allowing use of the vehicle within a predetermined area, the reservation acceptance means acquires reservation information including a boarding point and a disembarkation point within the area.

10. An operation management apparatus including:

a reservation acceptance means for acquiring reservation information including biometric information of a user making a boarding reservation for a vehicle, and a boarding point;

a boarding information acquisition means for acquiring boarding information including biometric information of the user generated by a generation means equipped on the vehicle and boarding place information indicating the boarding point; and an authentication means for determining whether there is a match of biometric information and a boarding point between the reservation information and the boarding information.

11. An operation management method including, by a computer:

acquiring reservation information including biometric information of a user making a boarding reservation for a vehicle, and a boarding point;

acquiring boarding information including biometric information of the user generated by a generation means equipped on the vehicle and boarding place information indicating the boarding point; and determining whether there is a match of biometric information and a boarding point between the reservation information and the boarding information.

12. A program for causing a computer to execute the operation management method according to aforementioned 11.

13. An operation management system including:

a reservation acceptance means for acquiring reservation information including a boarding point, a disembarkation point, and at least one of a scheduled boarding time and a scheduled disembarkation time, the points and the times being related to a user of a vehicle;

a status acquisition means for, when a facility associated with at least one point out of the boarding point and the disembarkation point exists, acquiring status information indicating status of the facility; and a proposal means for changing at least one of the scheduled boarding time and the scheduled disembarkation time, based on the acquired status information, and proposing the changed time to the user.

REFERENCE SIGNS LIST 100, 400 Operation management system
101, 401 User terminal
102, 202, 302 Server apparatus
103 Camera
104 Lock mechanism
105 Provision unit
106, 306 Operation management apparatus
RS1 Reservation screen
110 User storage unit
110a User information
111 Reservation acceptance unit
112 Planning unit
113 Authentication unit
120 Boarding information acquisition unit
121 Door control unit
122 Seat determination unit
230 Person-to-be-confirmed output unit
414 Status acquisition unit

What is claimed is:

1. An operation management system comprising:
at least one memory configured to store instructions; and
at least one processor configured to execute the instructions to perform operations comprising:

acquiring reservation information including a face image of a user making a boarding reservation for a vehicle, and a boarding point;

acquiring boarding information including the face image of the user generated under control of at least one additional processor equipped on the vehicle and boarding place information indicating the boarding point;

determining whether there is a match of the face image and the boarding point that are included in each piece of the reservation information and the boarding information, and providing the face image of the user to a driver of the vehicle in case that a determination result is no match, wherein the reservation information further includes a disembarkation point of the user and at least one of a scheduled boarding time and a scheduled disembarkation time, wherein the operations further comprise:

preparing an operation plan of the vehicle, based on the reservation information;

when a facility associated with at least one point out of the boarding point and the disembarkation point exists, acquiring status information indicating status of the facility; and changing, based on the acquired status information, at least one of the scheduled boarding time and the scheduled disembarkation time that are included in the operation plan and proposing the changed plan to the user, and wherein the status of the facility includes at least one of delay time from a reservation time in an actual medical examination and a waiting time at a checkout.

2. The operation management system according to claim 1, further comprising:

the at least one additional processor equipped on the vehicle, wherein the operations further comprise:

transmitting the operation plan to the at least one additional processor.

3. The operation management system according to claim 2, wherein the operations further comprise:

transmitting a result of determination related to whether there is the match of the face image and the boarding point.

4. The operation management system according to claim 1, further comprising:

the at least one additional processor equipped on the vehicle, wherein the at least one additional processor is configured to control a lock mechanism changing openability of a door of the vehicle or an open-close mechanism opening and closing the door, based on a result of determination related to whether there is the match of the face image and the boarding point.

5. The operation management system according to claim 1, further comprising:

the at least one additional processor equipped on the vehicle; and provider for providing information to the user, the provider being equipped on the vehicle, wherein the at least one additional processor is configured to, when the match is determined, determine a seat of the user in the vehicle and cause the provider to provide a position of the determined seat.

6. The operation management system according to claim 1, the wherein the operations further comprise:

based on user information including a use history of the user, outputting safety confirmation information indicating the user has not made a vehicle reservation for a predetermined period or longer.

7. The operation management system according to claim 1, wherein, the reservation information is acquired when the user making the boarding reservation corresponds to a ticket allowing use of the vehicle within a predetermined area, the reservation information including the boarding point and the disembarkation point within the predetermined area.

8. An operation management method comprising, by a computer:

acquiring reservation information including a face image of a user making a boarding reservation for a vehicle, and a boarding point;

acquiring boarding information including the face image of the user generated by at least one processor equipped on the vehicle and boarding place information indicating the boarding point;

determining whether there is a match of the face image and the boarding point between the reservation information and the boarding information; and providing the face image of the user to a driver of the vehicle in case that a determination result is no match, wherein the reservation information further includes a disembarkation point of the user and at least one of a scheduled boarding time and a scheduled disembarkation time, wherein the operation management method further comprises:

preparing an operation plan of the vehicle, based on the reservation information;

when a facility associated with at least one point out of the boarding point and the disembarkation point exists, acquiring status information indicating status of the facility; and changing, based on the acquired status information, at least one of the scheduled boarding time and the scheduled disembarkation time that are included in the operation plan and proposing the changed plan to the user, and wherein the status of the facility includes at least one of delay time from a reservation time in an actual medical examination and a waiting time at a checkout.

9. A non-transitory storage medium storing a program for causing a computer to execute:

acquiring reservation information including a face image of a user making a boarding reservation for a vehicle, and a boarding point;

acquiring boarding information including the face image of the user generated by at least one processor equipped on the vehicle and boarding place information indicating the boarding point;

determining whether there is a match of the face image and the boarding point between the reservation information and the boarding information; and providing the face image of the user to a driver of the vehicle in case that a determination result is no match, wherein the reservation information further includes a disembarkation point of the user and at least one of a scheduled boarding time and a scheduled disembarkation time, wherein the program is further for causing the computer to execute:

preparing an operation plan of the vehicle, based on the reservation information;

when a facility associated with at least one point out of the boarding point and the disembarkation point exists, acquiring status information indicating status of the facility; and changing, based on the acquired status information, at least one of the scheduled boarding time and the scheduled disembarkation time that are included in the operation plan and proposing the changed plan to the user, and wherein the status of the facility includes at least one of delay time from a reservation time in an actual medical examination and a waiting time at a checkout.

10. The operation management system according to claim 1, wherein, the facility includes a hospital.

* * * * *